Patented Dec. 1, 1936

2,062,750

UNITED STATES PATENT OFFICE 2,062,750

VINYL ACETAL RESIN EXTRUSION MIX AND METHOD OF MAKING THE SAME

Elmer H. Haux, Tarentum, Pa., assignor burgh Plate Glass Company, Allegheny Pa., a corporation of Pennsylvania No Drawing. Application January 22, 1936
Serial No. 60,265

12 Claims. (Cl. 106—22)

The invention relates to the formation of an extrusion mix of resin of the vinyl acetal type, for use in the production of strips and sheets, the sheets being designed particularly for use as reinforcing in making safety glass. While it is possible to extrude a resin of this kind through a die from a viscous mass consisting of the resin and a solvent, such as methyl alcohol, it has been found that the mass is sticky or tacky, and lacks strength, making it difficult to handle during the first stages of the removal of the solvent. One of the objects of the invention is to overcome this difficulty. I have found that the addition of a quantity of water to the extrusion mix consisting of the resin, plasticizer and solvent, not only produces an extrusion mix which is non-tacky and facilitates the extrusion of a uniform strip or sheet, but also permits the use of a mix containing a higher percentage of solids. This is important because it reduces the quantity of solvent to be recovered in subsequent operations, making the process faster and more economical.

While the mix containing the water will produce a uniform sheet, the surface of the finished product is somewhat rough; an objection when it is to be used for the preparation of safety glass, because of the difficulty of cleaning and because of the danger of occluded air and the formation of bubbles in the laminated plate. A further object of the invention is the overcoming of this difficulty. I have found that the addition to the mix of a relatively small percentage of a slow solvent having a relatively high boiling point, such as butanol, toluol, chlorobenzol, etc., yields a sheet having an extremely smooth surface, the butanol giving better results than the other high boiling solvents mentioned. In addition to producing a smooth sheet, the addition of butanol to the extrusion mix permits the hastening of the removal of the solvent from the extruded sheet by forced drying and elevated temperatures. For example, in the extrusion of cellulose esters it is necessary to pass the extruded web through liquids or gases where temperatures are very slowly and gradually increased in order to produce a sheet free from bubbles. In a continuous operation, this, of course, means that an enormous length of sheeting is being seasoned, requiring elaborate and expensive equipment. Much of this time and equipment is eliminated by my process.

A dough-like mass suitable for extrusion of a sheet can be obtained by precipitating a solution of the resin containing the desired plasticizer in a liquid which is miscible with the solvent, but is not miscible with the plasticizer nor a solvent for the resin. However, when precipitated in this way a considerable portion of the plasticizer is also dissolved due to localized concentrations of the solvent. Where a close control of plasticizer is necessary, i. e., for sheets to be used for laminated safety glass, this method is not satisfactory. In practice, however, it has been found that the plasticizer content may be maintained within satisfactory limits, if a quantity of water is added to the solution of the resin in the methyl alcohol just insufficient to cause precipitation at the boiling point of the solution and evaporating beyond the point of precipitation until a mass suitable for extrusion is obtained. The plasticizer and butanol are then added and the mix heated until a homogeneous mass is obtained. During this second heating, more solvent and water is evaporated to produce a mix having the desired viscosity for extrusion because of the solvent action of the plasticizer upon the resin.

By way of illustration, the following will serve as a specific example of the practice of the process on a commercial scale.

To a 12 per cent solution of a vinyl acetal resin consisting of 2½ to 4½ moles of vinyl alcohol per mole of an aldehyde (which limits have been found most suitable for safety glass) in methyl alcohol are added 1100 pounds of water per 2000 pounds of dry resin and the whole evaporated to a precipitated mass having approximately the formula:

| | Per cent |
|---|---|
| Resin | 40 |
| Water | 21 |
| Methyl alcohol | 31 |

To this mix are then added 1170 pounds of diethyl phthalate and 390 pounds of butanol. This mass is then further evaporated to a mass consisting of:

| | Per cent |
|---|---|
| Resin and plasticizer | 70 |
| Butanol | 8 |
| Methyl alcohol | 8 |
| Water | 14 |

The above mass can now be extruded through a slot to form a sheet of the desired thickness and width by any of the known methods, such as the use of air, screw stuffer, or hydraulic ram. The sheet produced is non-tacky, relatively strong and has a smooth surface. It is subject to rapid curing to remove the solvent as heretofore pointed out.

The foregoing treats with the method of producing the mix from a solution of the resin and it has been found that this gives the most perfect colloiding of the resin and plasticizer. The mix may be formed in other ways, however, as by merely mixing the resin, plasticizer and solvent in the proportions stated. The proportions of the ingredients may further be varied through rather a wide range depending on the equipment used for extrusion. The mix as above given may be rapidly extruded at 120 deg. F. with air pressure of 80 pounds, but with a screw stuffer or hydraulic ram, a more concentrated mix may be used with a subsequent saving of time in seasoning. An example of such a mix may be:

| | Percent |
|---|---|
| Resin and plasticizer | 81 |
| Butanol | 4.8 |
| Methyl alcohol | 6.4 |
| Water | 7.8 |

Various plasticizers may be employed in the mix, such as diethyl phthalate, dibutyl phthalate or dimethyl phthalate. The quantity of water will ordinarily not range above 20 per cent or below 4 per cent of the total mass. While a lower percentage of water involves some advantage, the functions of strengthening the sheet and avoiding tackiness are present in only a limited degree.

What I claim is:

1. An extrusion mix comprising a dough-like mass consisting of a plasticized vinyl acetal resin, a solvent of the resin and sufficient water to render the mass free from tackiness.

2. An extrusion mix comprising a dough-like, non-tacky mass consisting of a plasticized vinyl acetal resin, a solvent of the resin made up in part of low boiling solvent and in part of high boiling solvent and water.

3. An extrusion mix comprising a dough-like, non-tacky mass consisting of a plasticized vinyl acetal resin, a solvent of the resin made up in part of low boiling solvent and in part of butanol and water.

4. An extrusion mix comprising a dough-like, non-tacky mass consisting of a plasticized vinyl acetal resin, a solvent of the resin made up in part of methyl alcohol and in part of butanol and water.

5. An extrusion mix comprising a dough-like, non-tacky mass consisting of a plasticized vinyl acetal resin, a solvent of the resin and 4 to 20 per cent of water.

6. A method of forming an extrusion mix which consists in dissolving a vinyl acetal resin in a low boiling solvent thereof, adding water to the solution of a quantity short of that required to cause the resin to precipitate, adding a plasticizer of the resin to the mix, and heating the mix to evaporate off a part of the solvent and water and reduce the mix to a non-tacky, dough-like mass.

7. A method of forming an extrusion mix which consists in dissolving a vinyl acetal resin in a low boiling solvent thereof, adding water to the solution of a quantity just short of that required to cause the resin to precipitate, adding a plasticizer and high boiling solvent of the resin to the mix, and heating the mix to evaporate off a part of the solvent and water and reduce the mix to a non-tacky, dough-like mass.

8. A method of forming an extrusion mix which consists in dissolving a vinyl acetal resin in a low boiling solvent thereof, mixing a quantity of water with the solution, adding a plasticizer of the resin to the mix, and a high boiling solvent to the mix, and heating the mix to evaporate off a part of the solvent and water and reduce the mix to a non-tacky, dough-like mass.

9. A method of forming an extrusion mix which consists in dissolving a vinyl acetal resin in a low boiling solvent thereof, adding water to the solution of a quantity short of that required to cause off the resin to precipitate, heating to evaporate off a part of the solvent and water reducing the mix to a viscous mass, adding a plasticizer of the resin to the mix, and heating to evaporate off a further portion of the solvent and water and reduce the mix to a non-tacky, dough-like mass.

10. A method of forming an extrusion mix which consists in dissolving a vinyl acetal resin in a low boiling solvent thereof, mixing a quantity of water with the solution, adding water to the solution of a quantity short of that required to cause the resin to precipitate, heating to evaporate off a part of the solvent and water reducing the mix to a viscous mass, adding a plasticizer of the resin, and a high boiling solvent to the mix, and heating to evaporate off a further portion of the solvent and water and reduce the mix to a non-tacky, dough-like mass.

11. A method of forming an extrusion mix which consists in dissolving a vinyl acetal resin in methyl alcohol, adding water to the solution of a quantity short of that required to cause the resin to precipitate, heating to evaporate off a part of the methyl alcohol and water reducing the mix to a viscous mass, adding a plasticizer of the resin and a quantity of high boiling solvent to the mix, and heating the mix to evaporate off a further portion of the methyl alcohol and water and reduce the mix to a non-tacky, dough-like mass.

12. A method of forming an extrusion mix which consists in dissolving a vinyl acetal resin in methyl alcohol, adding water to the solution of a quantity short of that required to cause the resin to precipitate, heating to evaporate off a part of the methyl alcohol and water reducing the mix to a viscous mass, adding a plasticizer of the resin and a quantity of butanol to the mix, and heating the mix to evaporate off a further portion of the methyl alcohol and water and reduce the mix to a non-tacky, dough-like mass.

ELMER H. HAUX.